United States Patent
Shaked et al.

(10) Patent No.: US 6,722,567 B2
(45) Date of Patent: Apr. 20, 2004

(54) GENERATING AND DECODING GRAPHICAL BAR CODES

(75) Inventors: Doron Shaked, Haifa (IL); Avraham Levy, Tivon (IL); Jonathan Yen, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 159 days.

(21) Appl. No.: 09/877,516

(22) Filed: Jun. 7, 2001

(65) Prior Publication Data

US 2003/0047612 A1 Mar. 13, 2003

(51) Int. Cl.[7] ................................. G06K 7/10
(52) U.S. Cl. ................................. 235/462.01
(58) Field of Search ....................... 235/462.01, 462.25, 235/462.27, 462.05, 468, 494, 375, 456, 469; 382/222, 217, 317, 183, 100, 168, 287, 298, 170, 218

(56) References Cited

U.S. PATENT DOCUMENTS

| | | | |
|---|---|---|---|
| 3,898,689 A | * | 8/1975 | D'Orazio et al. ............ 360/40 |
| 4,245,152 A | * | 1/1981 | Flurry et al. ............ 235/462.19 |
| 5,091,966 A | * | 2/1992 | Bloomberg et al. ......... 382/203 |
| 5,591,956 A | * | 1/1997 | Longacre et al. ......... 235/462.1 |
| 5,726,435 A | * | 3/1998 | Hara et al. .................. 235/494 |
| 5,745,589 A | | 4/1998 | Iwai |
| 5,946,415 A | * | 8/1999 | Su et al. ...................... 382/190 |
| 5,974,200 A | * | 10/1999 | Zhou et al. ................. 382/298 |
| 5,996,893 A | * | 12/1999 | Soscia .................... 235/462.01 |
| 6,000,614 A | * | 12/1999 | Yang et al. .................. 235/460 |
| 6,064,738 A | * | 5/2000 | Fridrich ........................ 380/28 |
| 6,201,901 B1 | * | 3/2001 | Zhou et al. ................. 382/306 |
| 6,256,398 B1 | * | 7/2001 | Chang ......................... 382/100 |
| 6,457,651 B2 | * | 10/2002 | Paul et al. .................... 235/494 |

FOREIGN PATENT DOCUMENTS

| | | | |
|---|---|---|---|
| EP | 672 994 | * | 3/1995 |
| EP | 0672994 A1 | | 9/1995 |
| EP | 0825547 A2 | | 2/1998 |
| WO | WO00/11599 | | 3/2000 |

* cited by examiner

*Primary Examiner*—Karl D. Frech
*Assistant Examiner*—Edwyn Labaze

(57) ABSTRACT

Systems and methods for automatically generating and decoding a graphical bar code (i.e., an image that contains inconspicuous graphical modulations that encode embedded information) are described. In one aspect, an invertible graphical operation is applied between regions of a base image and information-encoding graphical templates that are selected from a predefined template set to produce a graphical bar code with regions from which graphical templates are recoverable by applying an inverse graphical operation between graphical bar code regions and corresponding base image regions. In another aspect, an invertible graphical operation is applied between regions of a graphical bar code and corresponding regions of a base image to produce a set of measurement blocks, and information-encoding graphical templates corresponding to the set of measurement blocks with the highest estimated probability is selected from a predefined template set.

23 Claims, 5 Drawing Sheets

GENERATING AND DECODING GRAPHICAL BAR CODES

CROSS-REFERENCE TO RELATED APPLICATIONS

This application relates to the following co-pending applications, each of which is incorporated herein by reference: U.S. patent application Ser. No. 09/579,070, filed May 25, 2000, by Doron Shaked et al., and entitled "A Method and Apparatus for Generating and Decoding a Visually Significant Bar Code;" U.S. patent application Ser. No. 09/429,515, filed Oct. 28, 1999 by Renato Kresch et al., and entitled "System and Method for Counterfeit Protection;" U.S. Ser. No. 09/728,292, filed Dec. 1, 2000, by Jonathan Yen et al., and entitled "Authenticable Graphical Bar Codes;" U.S. patent application Ser. No. 09/578,843, filed May 25, 2000, by Doron Shaked et al., and entitled "Geometric Deformation Correction Method and System for Dot Pattern Images;" U.S. Ser. No. 09/877,517, filed on even date herewith, by Doron Shaked et at., and entitled "Fiducial Mark Patterns for Graphical Bar Codes"; and U.S. patent application Ser. No. 09/877,581, filed on even date herewith, by Jonathan Yen et al., and entitled "Automatically Extracting Graphical Bar Codes".

TECHNICAL FIELD

This invention relates to systems and methods for generating and decoding graphical bar codes.

BACKGROUND

A typical bar code symbol is a pattern of parallel bars and spaces of various widths that represent data elements or characters. The bars represent strings of binary ones and the spaces represent strings of binary zeros. A conventional "one-dimensional" bar code symbol contains a series of bars and spaces that vary only in a single dimension. One-dimensional bar code symbols have relatively small information storage capacities. "Two-dimensional" bar codes have been developed to meet the increasing need for machine-readable symbols that contain more information than one-dimensional bar code symbols. The information storage capacity of two-dimensional bar code symbols is increased relative to one-dimensional bar codes by varying the bar code patterns in two dimensions. Common two-dimensional bar code standards include PDF417, Code 1, and Maxicode. One-dimensional and two-dimensional bar code symbols typically are read by optical scanning techniques (e.g., by mechanically scanned laser beams or by self-scanning charge-coupled devices (CCD's)) that convert a printed bar code symbol into electrical signals. The electrical signals are digitized and decoded to recover the data encoded in the printed bar code symbol.

Bar codes may be used in a variety of applications, including low information content applications (e.g., automatic price tagging and inventory management), and relatively high information content applications (e.g., encoding mail addresses and postage for automated mail reading and mail distribution systems, and encoding compressed content of a printed page).

SUMMARY

As used herein, the term "graphical bar code" broadly refers to an image that contains inconspicuous graphical modulations that encode embedded information.

The invention features an inventive scheme (systems and methods) for generating and decoding graphical bar codes characterized by relatively high information capacity and pleasing visual appearances that correspond substantially to their respective base image patterns.

In one aspect of the invention, an invertible graphical operation is applied between regions of a base image and information-encoding graphical templates that are selected from a predefined template set to produce a graphical bar code with regions from which graphical templates are recoverable by applying an inverse graphical operation between graphical bar code regions and corresponding base image regions.

Embodiments in accordance with this aspect of the invention may include one or more of the following features.

In some embodiments, the invertible graphical operation corresponds to an exclusive OR (XOR) operation. In these embodiments, XOR operations may be applied between the graphical bar code regions and corresponding base image regions to produce the graphical templates.

In some embodiments, each of the base image regions and the graphical templates has the same number of pixels. Each of the base image regions and the graphical templates preferably has the same pixel layout (e.g., a rectangular or non-rectangular pixel array).

Each graphical template preferably comprises a pattern of bright and dark pixels. The number of bright pixels preferably is greater than the number of dark pixels. Each pixel location within the predefined template set preferably has an equal probability of being a dark pixel.

In some embodiments, the graphical templates may be ordered adaptively in accordance with one or more predefined rules relating to disfavored graphical template sequences.

In another aspect of the invention, an invertible graphical operation is applied is between regions of a graphical bar code and corresponding regions of a base image to produce a set of measurement blocks, and information-encoding graphical templates corresponding to the set of measurement blocks with the highest estimated probability is selected from a predefined template set.

Embodiments in accordance with this aspect of the invention may include one or more of the following features.

The invertible graphical operation preferably corresponds to an XOR operation.

In some embodiments, pixel value probabilities preferably are computed for each of the measurement blocks. The pixel value probabilities may be computed for a given measurement block based upon a weighted average of gray value measurements over the given measurement block. The weighted average of gray values may be computed by fitting a mask (e.g., a mask having a truncated Gaussian profile) to the dot locations over the given measurement block. Parameters of probability distributions (e.g., asymmetric Laplacian distributions) that are fit to a histogram of the weighted average of gray value measurements may be estimated.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
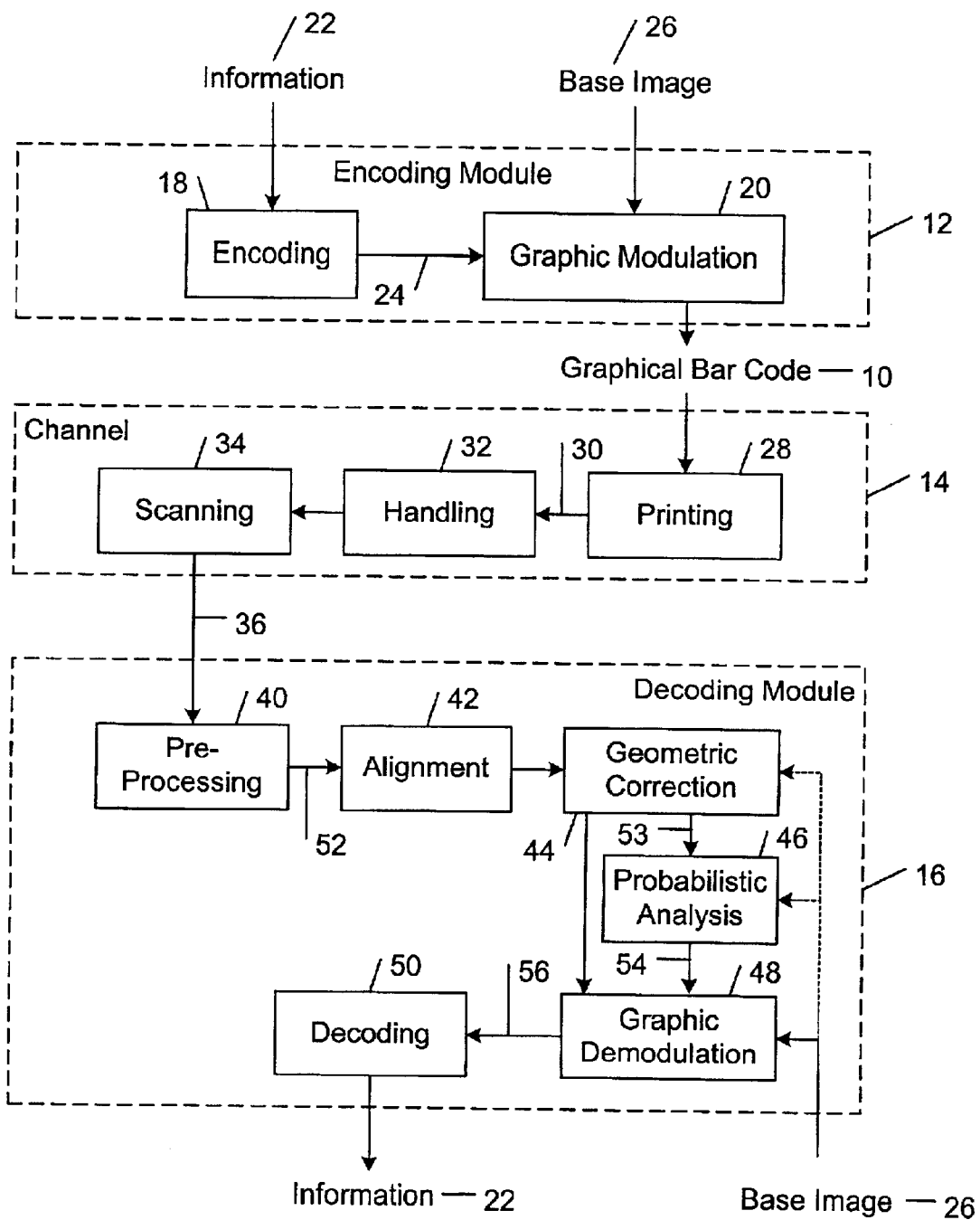
FIG. 1 is a block diagram of an encoding module, a decoding module, and document-handling channel through which one or more graphical bar codes may be transmitted.

Referring to FIG. 1, in one embodiment, a graphical bar code 10 may be generated by an encoding module 12, processed through a document-handling channel 14, and decoded by a decoding module 16.

Encoding module 12 includes an encoding stage 18 and a graphic modulation stage 20. Encoding module 12 may be implemented as one or more program modules that are executable on a computer or other programmable processor. In operation, encoding module 12 encodes information 22 into an encoded message 24. For example, information 22 may be compressed in accordance with a conventional compression algorithm, and encoded with an error correction code. Error correction coding provides robustness to errors due to degradations introduced by document-handling channel 14. The error correction codes also may be interleaved to protect against burst errors. In some embodiments, encoding module 12 may be programmed to generate from information 22 a corroborative signed message in accordance with the encoding process described in U.S. Ser. No. 09/728,292, filed Dec. 1, 2000, by Jonathan Yen et al., and entitled "Authenticable Graphical Bar Codes." As explained in detail below, during the encoding stage 18, the compressed and error correction coded message is translated into an ordered sequence of information-encoding graphical templates. During the graphic modulation stage 20, a base image 26 is modulated in accordance with the ordered sequence of graphical templates to produce graphical bar code 10. In particular, an invertible graphical operation is applied between regions of base image 26 and the ordered sequence of information-encoding graphical templates to produce graphical bar code 10. Base image 26 may be any binary discrete graphical pattern, including a logo (e.g., a company logo), graphics, pictures, text, images, or any pattern that has visual significance. Information 22 may be embedded in the graphical design of text, pictures, images, borders, or the background of base image 26 to produce graphical bar code 10. Information 22 may be embedded in graphical bar code 10 in the form of a binary image (e.g., a dark and bright dot pattern), a multilevel image (e.g., a gray-level image), or a multilevel color image.

In the document-handling channel 14, graphical bar code 10 may be converted into one or more hard copies 30 by a printing stage 28. Hard copies 30 may be processed through a handling stage 32 before being converted into an electronic scanned image 36 by a scanning stage 34. Graphical bar code 10 may be printed by a conventional printer (e.g., a LaserJet® printer available from Hewlett-Packard Company of Palo Alto, Calif., U.S.A.) or a special-purpose label printing device. Hard copies 30 may be in the form of any one of a wide variety of printed materials, including a bank draft (or check) carrying a graphical bar code of a withdrawal authorization signature, a stock certificate or bond carrying a graphical bar code of an authenticity certification, and an envelope carrying a graphical bar code of postage indicia. Hard copies 30 may be scanned by a conventional desktop optical scanner (e.g., a ScanJet® scanner available from Hewlett-Packard Company of Palo Alto, Calif., U.S.A.) or a portable scanner (e.g., a CapShare® portable scanner available from Hewlett-Packard Company of Palo Alto, Calif., U.S.A.). The scanned image 36 that is acquired by the scanner and introduced into decoding module 16 is a degraded version of the original graphical bar code 10. These degradations may be generated at one or more of the document-handling channel stages, including the printing stage 28, the handling stage 32 (e.g., copying degradations, stains, folds, staples, and markings), and the scanning stage 34.

In general, decoding module 16 includes a pre-processing stage 40, an alignment stage 42, a geometric correction stage 44, a probabilistic analysis stage 46, a graphic demodulation stage 48, and a decoding stage 50. Decoding module 16 may be implemented as one or more program modules that are executable on a computer or other programmable processor. During the pre-processing stage 40, a scanned graphical bar code image 52 may be located in scanned image 36, and non-bar code regions may be cropped and trimmed from scanned image 36. During the alignment stage 42, fiducial marks are detected in scanned bar code image 52. The configuration of the detected fiducial marks indicates the type of global deformations that might have been introduced into the graphical bar code during transmission of hard copies 30 through document handling channel 14. These global deformations (e.g., translational, rotational, affine and skew distortions may be corrected during the geometric correction stage 44, as described in U.S. patent application Ser. No. 09/579,070, filed May 25, 2000, by Doron Shaked et al., and entitled "A Method and Apparatus for Generating and Decoding a Visually Significant Bar Code." During the probabilistic analysis stage 46, probability models are applied to pixel value measurements obtained from the aligned and geometrically corrected scanned bar code image 53 to produce a set of probability parameters 54. As explained in detail below, the probability parameters 54 are used during the graphic demodulation stage 48 to select the most likely sequence of information-encoding graphical templates that corresponds to the graphical template sequence that was originally encoded into base image 26. The selected graphical template sequence is translated into an encoded message 56 that is decoded into information 22 by the decoding stage 50.

Figure 2:
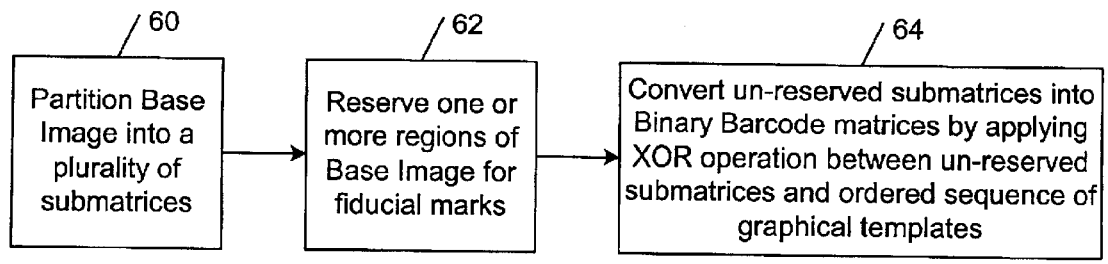
FIG. 2 is a flow diagram of a method of rendering a base image with a graphical encoding of information.
Figure 3A:
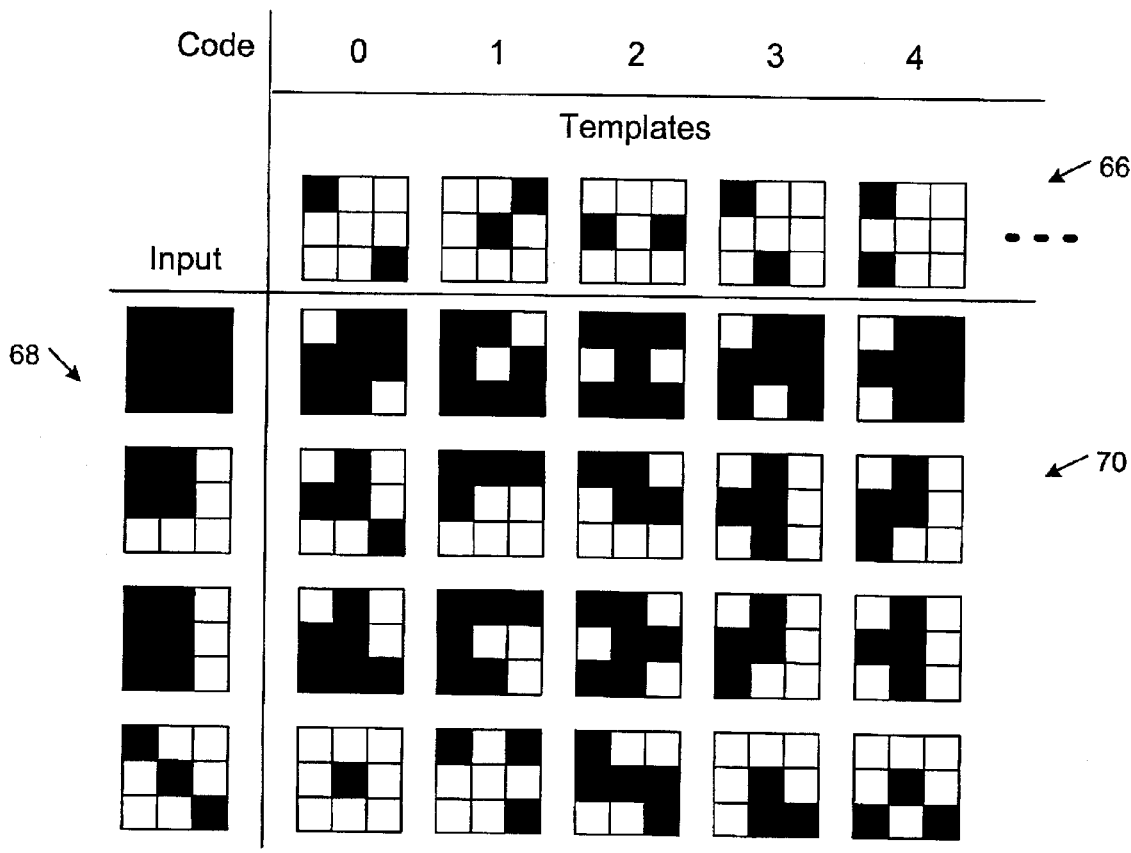
FIG. 3A is a table mapping information to a bi-level graphical code in accordance with an XOR graphical operation that is applied between regions of a base image and a set of information-encoding graphical templates.
Figures 3B, 4:
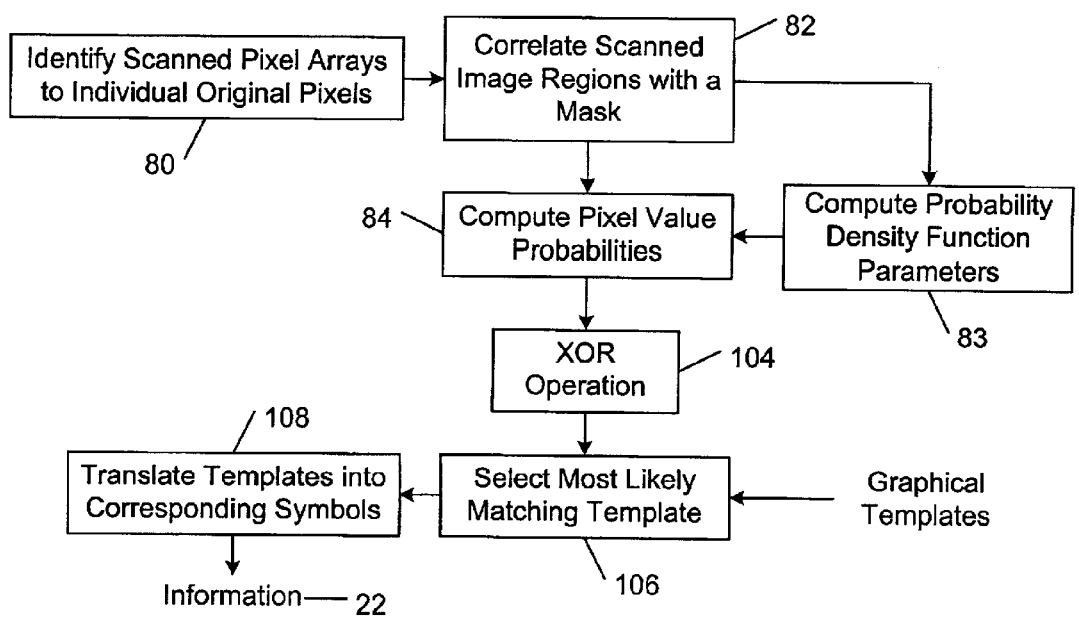
FIG. 3B is a table mapping information to a bi-level graphical code in accordance with an XOR graphical operation that is applied between regions of a base image and an alternative set of information-encoding graphical templates.
FIG. 4 is a flow diagram of a process of decoding a graphical bar code based upon the application of a maximum likelihood principle.

Referring to FIGS. 2, 3A and 3B, graphical bar code 10 may be produced by graphically modulating base image 26 in accordance with the following graphical encoding scheme. Base image 26 is partitioned into a plurality of sub-matrices (or sub-images) (step 60). For example, if base image 26 is an M×N pixel image, it may be partitioned into a regular array of O K×K pixel sub-matrices, where O=M× N/(K×K). One or more regions of base image 26 are reserved for fiducial markings (step 62). In one embodiment, the four corners of base image 26 may be reserved for fiducial markings. In other embodiments, fiducial markings may circumscribe base image 26, as described in U.S. Ser. No. 09/877,517, filed on even date herewith, by Doron Shaked et al., and entitled "Fiducial Mark Patterns for Graphical Bar Codes". The remaining un-reserved sub-matrices are ordered in raster scan and converted into binary bar code matrices by applying an invertible graphical operation (e.g., an XOR graphical operation) between the un-reserved sub-matrices and a sequence of information-encoding graphical templates that is ordered in accordance with the information 22 to be encoded (step 64). In general, the invertible graphical operation should generate a mapping (f) from the base image sub-matrices ($BI_i$) and the graphical templates ($T_i$) to the graphical bar code regions ($GBC_i$) that may be inverted (f') to recover graphical templates ($T_i$) from the base image sub-matrices ($BI_i$) and the graphical bar code regions ($GBC_i$). That is, $$f(BI_i, T_j) \rightarrow GBC_i \quad (1)$$

$$f'(BI_i, GBC_i) \rightarrow T_j \quad (2)$$

In one embodiment, the invertible graphical operation corresponds to an XOR graphical operation, which operates on a pair of input pixel values to produce an output pixel value in accordance with the following XOR function:

TABLE 1

XOR Graphical Operation.

| First Input Pixel Value | Second Input Pixel Value | Output Pixel Value |
|---|---|---|
| Dark | Dark | Bright |
| Dark | Bright | Dark |
| Bright | Dark | Dark |
| Bright | Bright | Bright |

This XOR graphical operation satisfies the above-described invertibility feature, as shown in equations (3) and (4) below.

$$XOR(BI_i, T_j) \rightarrow GBC_i \quad (3)$$

$$XOR(BI_i, GBC_i) \rightarrow T_j \quad (4)$$

In accordance with this graphical encoding approach, the K pixel base image sub-matrices are modulated and rendered as K×K pixel graphical bar code regions. In other words, each base image pixel is rendered as a single dot in graphical bar code 10 so that the original resolution of base image 26 is preserved in graphical bar code 10. In addition, suppose we have two identical base image regions, which we code using two different templates. The difference between the resulting encoded graphical bar code regions is the same as the difference between the two corresponding template patterns. That is, the Hamming distance between XOR output patterns is identical to the distance between corresponding codes. As a result, template patterns that are sufficiently different, give rise to sufficiently different XOR output patterns.

As shown in FIG. 3A, in one graphical encoding embodiment, information 22 may be encoded into a bi-level graphical bar code image based upon a set of graphical templates 66 (or halftone patterns). In this embodiment, un-reserved sub-matrices 68 partitioned from base image 26 are modulated by applying an XOR graphical operation between base image sub-matrices 68 and graphical templates 66. The graphical templates 66 are 3×3 pixel patterns corresponding to the thirty-six possible arrangements of two dark dots in a 3×3 pattern (only five of the thirty-six graphical templates are shown in FIG. 3A). In some embodiments, all thirty-six graphical templates may be used for encoding messages 24. In other embodiments, only thirty-two of the template patterns may be used to encode five bits. In order not to be biased by the selection of a predefined set of codes, the particular templates selected for coding may be cycled through the thirty-six templates. For example, the code $C_{36}$ (one of thirty-six) may be obtained from the desired code $C_{32}$ (one of thirty-two) in accordance with equation (5):

$$C_{36} = mod_{36}(C_{32} + \text{counter}) \quad (5)$$

where the counter is incremented after every use. During decoding, $C_{32}$ is decoded from $C_{36}$ in accordance with equation (6):

$$C_{32} = mod_{32}(C_{36} - \text{counter}) \quad (6)$$

As shown in FIG. 3B, the template pixels need not be arranged in a regular rectangular array. In this embodiment, graphical templates 72 correspond to the set of thirty-six possible arrangements of either one or two dark dots in a skewed 4×2 pixel arrangement. In general, the graphical encoding process may be extended to n-bit encoding mappings, where n has an integer value of 2 or greater. The information density of this approach increases with the number (L) of graphical templates in accordance with $\log_2 L$. Thus, each of the template sets of FIGS. 3A and 3B has an information density of over five bits.

In general, the visual quality of graphical bar code 10 improves with the contrast level of the graphical template patterns. Assuming the contrast between pure dark regions and pure bright regions is 1, the average contrast (C) between dark and bright graphical bar code regions 70 is given by:

$$C = 1 - 2 \cdot \frac{D}{K} \quad (7)$$

where D is the number of dark dots in each template pattern and K is the total number of dot locations in each template pattern. In the embodiments of FIGS. 3A and 3B, the contrast level is 5/9. In addition to constructing template sets characterized by relatively high contrast levels, the visual quality of graphical template 10 may be improved by constructing the template sets such that each pixel location within a given template set has an equal probability of being a dark pixel. The visual quality of graphical bar code 10 also may be improved by constructing templates in which the local density of dark dots is uniform. In the embodiments of FIGS. 3A and 3B, substantial local dark density uniformity is achieved by limiting the number of dark pixels in each template pattern to a relatively small fraction of the total number of pixels. In some embodiments, the local dark dot density uniformity may be improved by modifying the template codebook adaptively. That is, the graphical templates may be adaptively ordered in accordance with one or more predefined rules relating to disfavored graphical template sequences. For example, in accordance with this approach, graphical template pairs with patterns that increase the local dark dot density when concatenated may be avoided adaptively during the decoding process.

Referring to FIGS. 4, 5, 6 and 7, in one embodiment, graphical bar code 10 may be decoded as follows.

Referring initially to FIG. 4, pixel arrays in the scanned and aligned bar code image are identified to individual pixels in the original bar code image 10 (step 80). Typically, the graphical bar code is scanned at a high resolution such that each original pixel corresponds to an array of r×r scanned pixels. Due to the visual degradation that often is caused by the printing, handling and scanning processes of document-handling channel 14, the resulting arrays of scanned pixels are no longer homogenous and, instead, contain scanned pixels of different gray levels. Under these conditions, the borders of the scanned pixels arrays corresponding to each pixel in the original graphical bar code 10 are identified in accordance with the method described in U.S. patent application Ser. No. 09/578,843, filed May 25, 2000, by Doron Shaked et al., and entitled "Geometric Deformation Correction Method and System for Dot Pattern Images."

As explained in detail below, after each r×r pixel array in scanned bar code image 52 has been identified with a single original graphical bar code pixel, the arrays are correlated with a mask (step 82), probability density function parameters are estimated (step 83), and the pixel value probability (i.e., the probability of being a dark (or bright) pixel) is determined for each original pixel (step 84). In the following description, s is defined as an array of scanned pixels corresponding to one original pixel and the gray levels of its scanned pixels are denoted by $s_{i,j}$ where i, j=1, . . . ,r.

Figure 5:
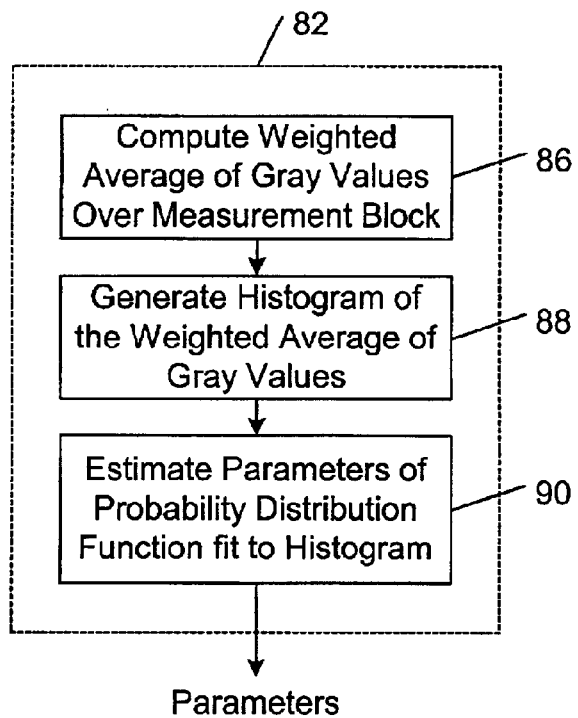
FIG. 5 is a block diagram of a process of computing probability function parameters for pixel values.
Figure 6:
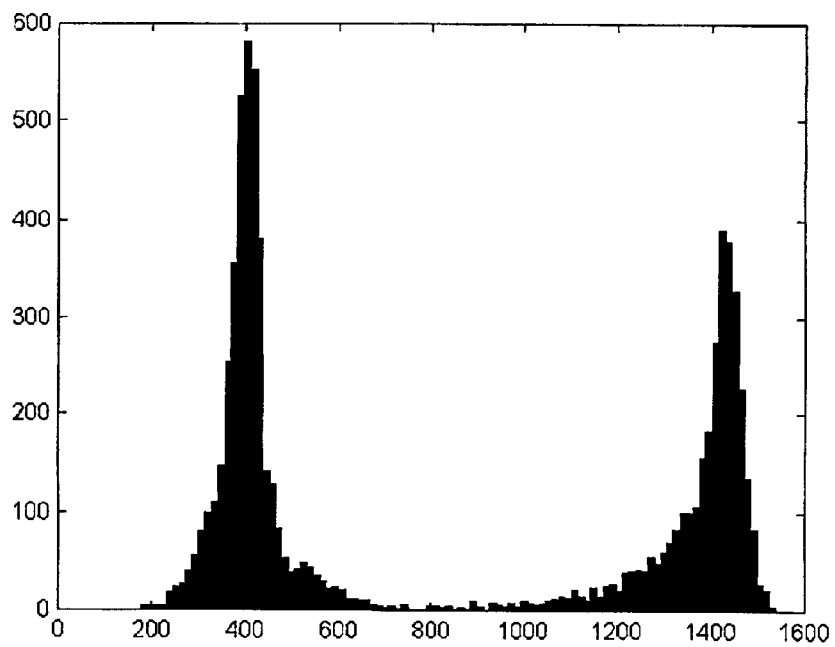
FIG. 6 is an example of a histogram computed in block 88 of FIG. 5.

Referring to FIG. 5, a weighted average of gray values is computed for each pixel of each measurement block (step 86). To that end, a function of the $s_{i,j}$ that discriminates between arrays that corresponds to dark original pixels and those corresponding to bright original pixels is applied to the scanned pixel arrays. In one embodiment, the linear discrimination function of equation (8) is applied to the scanned pixel arrays to discriminate between dark and bright pixels.

$$f(s) = \sum_{i,j=1,r} c_{i,j} s_{i,j} \qquad (8)$$

where the coefficients $c_{i,j}$ are taken as grid values of the two dimensional truncated gaussain shaped surface of equation (9).

$$\text{pos}(\exp(-(x-c)^{2/s)-\Delta}) \qquad (9)$$

where x indicates the mask coordinate, c the center of the dot pattern, $\Delta$ the truncation factor, s a scalar factor, and pos (x)=x for x>0 and 0 for x≦0. The scalars s and $\Delta$, are tuned according to the scanning resolution and the expected deformation strength. In one embodiment, s and $\Delta$ are set so that the mask is 0 along a band whose width is about ⅓ dot size, and rises to half its amplitude at about ⅓ dot size away from the center.

The measurements are collected, and analyzed to find a threshold indicating whether the original pixel corresponding to a measured pattern is dark or bright. To this end, a histogram of the discrimination function is computed for each pixel in the scanned halftoned image (step 88). The histogram measurements are a weighted average of gray values of aligned and geometrically corrected dot locations over a given image. The horizontal axis is a linear function of the weighted average of gray values, and the vertical axis is the histogram count axis. The right side population belongs to "bright" pixels and the left side population belongs to "dark" pixels. Based on the shape of such histograms, the distribution of f(s) may be modeled by bi-modal non-symmetric exponential distributions. For example, in one embodiment, dark (bright) pixels y=f(s) may be assumed to be distributed in accordance with the asymmetric Laplacian distributions of equation (10).

$$P(y|\alpha_L, \alpha_R, \mu) = \begin{cases} \alpha_L \exp\{-\alpha_L(\mu - y)\} & y < \mu \\ \alpha_R \exp\{-\alpha_R(y - \mu)\} & y > \mu \end{cases} \qquad (10)$$

The parameters of the distribution functions are estimated (step 90). Since the parameters $\alpha_L$, $\alpha_R$ and $\mu$ are different for the dark pixel population and the bright pixel population, the overall number of parametrs to be estimated in this probabilistic approach is six. To simplify the notations in the following description, dark pixels are denoted by 0 and bright pixels are denoted by 1, and the parameters are indexed accordingly.

Figure 7:
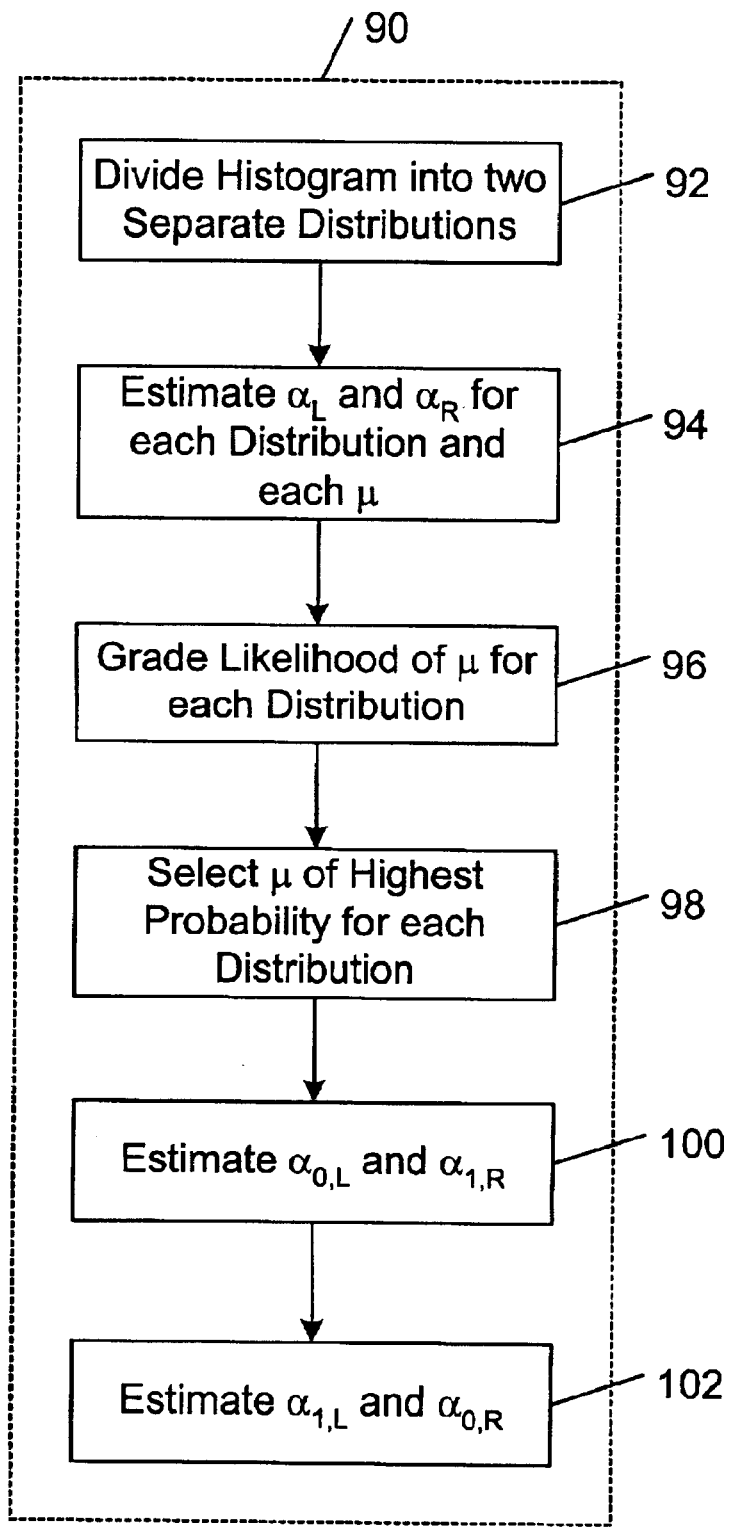
FIG. 7 is a flow diagram of method of estimating parameters of a pair of probability distribution functions fit to the histogram of FIG. 6.

As shown in FIG. 7, in order to reduced the computational burden, the parameter estimation process (step 90) is divided into two steps: (1) estimating $\mu_0$, $\mu_1$, $\alpha_{0L}$ and $\alpha_{1R}$; and (2) estimating $\alpha_{1L}$ and $\alpha_{0R}$.

Initially, the observations $y_i = f(g_i)$ are partitioned into two populations based upon the known expected numbers of "dark" pixels ($N_0$) and "bright" pixels ($N_1$) (step 92). The "dark" population includes the smallest $N_0$ observations and the "bright" populations includes the rest (largest $N_1$). For each of these populations the mode ($\mu$) is estimated by the following maximum likelihood approximated method. The value of $\mu$ (for the sake of simplicity we ignore the 0/1 subscript) that maximizes the maximum likelihood estimator for $\mu$ is computed from equation (11).

$$\bar{\mu} = \text{Arg}\left\{\max\left[\sum_{i \in I_L} \log \alpha_L - \alpha_L(\mu - y_i) + \sum_{i \in I_R} \log \alpha_R - \alpha_R(y_i - \mu)\right]\right\} \qquad (11)$$

where $I_L$ is the set of observations smaller than $\mu$, and $I_R$ is the set of observations larger than $\mu$. Since the true values of $\alpha_L$ and $\alpha_R$ are not known, they are estimated for each tested value of $\mu$ by equations (12) and (13) (step 94).

$$1/\alpha_L = (1/N_L) \sum_{i \in I_L} \mu - y_i \qquad (12)$$

$$1/\alpha_R = (1/N_R) \sum_{i \in I_R} y_i - \mu \qquad (13)$$

where $N_L = |I_L|$ and $N_R = |IR|$. After substituting equations (12) and (13) into equation (11) and simplifying the resulting expression, $\bar{\mu}$ may be expressed as follows:

$$\bar{\mu} = \text{Arg}\left\{\max \right. \qquad (14)$$
$$\left. \left[N_L\left(\log N_L - \log\sum_{i \in I_L}(\mu - y_i)\right) + N_R\left(\log N_R - \log\sum_{i \in I_R}(y_i - \mu)\right)\right]\right\}$$

(Note that $I_L$ and $I_R$—and hence $N_L$ and $N_R$—are functions of $\mu$.)

The most likely value of $\mu$ is computed from equation (14) (step 98). The estimates for $\alpha_{0L}$ and $\alpha_{1R}$ are derived directly from equations (12) and (13) using the computed estimates for $\mu_0$ and $\mu_1$ (step 100).

After $\mu_0$, $\mu_1$, $\alpha_{0L}$ and $\alpha_{1R}$ have been estimated, the parameters $\alpha_{1L}$ and $\alpha_{0R}$ may be estimated (step 102). (Hereinafter, the notations $\alpha_1$ and $\alpha_0$ are used for $\alpha_{1L}$ and $\alpha_{0R}$, respectively.) All observations below $\mu_0$, and above $\mu_1$ are ignored and $I_M$ and $N_M$ are defined as $I_M = \{y | \mu_0 \leq y \leq \mu_1\}$ and $N_M = |I_M|$. The observations $\{y_i: i \in I_M\}$ are are to be samples from a random vector with the following distribution:

$$P(y_i, x_i) = \prod_{i \in I_M} P_{x_i} \alpha_{x_i} \exp\{-\alpha_{x_i}|y_i - \mu_{x_i}|\} \quad (15)$$

where $x_i$ takes the values 0 or 1 with the probabilities $P_0$ and $P_1$, respectively. The EM paradigm is used to estimate $\alpha_1$ and $\alpha_0$. The EM algorithm begins with initial values for the parameters and perform a series of updating stages that converge to a (local) maximum of the mean maximum likelihood objective function.

To estimate the values of $\alpha_1$ and $\alpha_0$ the conditional expectation of equation (16) is maximized at each stage of the algorithm.

$$E[\log P(y_i, x_i)|\alpha_0, \alpha_1, y_1] = \quad (16)$$
$$\sum_{i \in I_M} P(0|\alpha_0, \alpha_1, y_i)[\log(P_0\alpha_0) - \alpha_0(y_i - \mu_0)] +$$
$$P(1|\alpha_0, \alpha_1, y_i)[\log(P_1\alpha_1) - \alpha_1(y_i - \mu_1)]$$

The estimation for $\alpha_{1L}$ and $\alpha_{0R}$ are the values of the estimates for $\alpha_1$ and $\alpha_0$ at the last updating stage. The EM algorithm includes an initialization step and an updating step. During the initialization step, for each y, the gray-level of the original pixel is denoted by $g_i$.

Referring back to FIG. 4, an XOR operation is applied between the scanned image measurement blocks and the corresponding base image regions to recover the templates embedded in the measurement blocks (step 104). In accordance with the XOR modulation scheme described above, the halftone pixel corresponding to $g_i$ has probability $g_i$ to be 0 and $(1-g_i)$ to be 1. The value $p^0(0|y_i)=g_i$ is defined for each $i \in I_M$. During the updating step, equations (17) and (18) are computed.

$$E_0(j) = \frac{\sum_{i \in I_M} p^j(0|y_i)(y_i - \mu_0)}{\sum_{i \in I_M} p^j(0|y_i)} \quad (17)$$

$$E_1(j) = \frac{\sum_{i \in I_M} p^j(1|y_i)(\mu_1 - y_i)}{\sum_{i \in I_M} p^j(1|y_i)} \quad (18)$$

where $p^j(1|y_i)=1-p^j(0|y_i)$. Next, $\alpha_0(j)$, $\alpha_1(j)$ and $p^{j+1}(0|y_i)$ are computed from equations (19), (20) and (21), respectively.

$$\alpha_0(j) = 1/E_0(j) \quad (19)$$

$$\alpha_1(j) = 1/E_1(j) \quad (20)$$

$$p^{j+1}(0|y_i) = \frac{p^0(0|y_i)\alpha_0(j)\exp\{-\alpha_0(j)y_i\}}{p^0(0|y_i)\alpha_0(j)\exp\{-\alpha_0(j)y_i\} + p^0(1|y_i)\alpha_1(j)\exp\{-\alpha_1(j)y_i\}} \quad (21)$$

Next, the most likely template sequence corresponding to the recovered template sequence is selected (step 106). Given the probability of each pixel in the scanned image S to originate from a dark (bright) pixel, the appropriate code words can be scored according to the following maximum likelihood algorithm. Let $w=(w_1, \ldots, w_L)$ be a codeword form the codebook of a given sub-image $p=(p_1, \ldots, p_L)$ in I. Assume that the corresponding scanned sub-image in S has discriminative function values $y=(y_1, \ldots, y_L)$. The maximum likelihood score for w is given by $s(w)=P(w|y)$. Since each code word has equal a priori probability, under the assumption that observations are stochastically independent, this score is equivalent to:

$$s(w) = P(y|w) = \prod_{i=1,L} P(y_i|w_i) \quad (22)$$

The log likelihood score is given by:

$$scr(w) = \log P(y|w) = \sum_{i=1,L} \log P(y_i|w_i) \cong \quad (23)$$
$$\sum_{i=1,L} (-1)^{w_i} \log(P(y_i|0)/P(y_i|1))$$

where "≅" means equal up to a constant that does not depend on w. Substituting $P(y_i|0)$ and $P(y_i|1)$ in equation (22) for the expressions of the bi-modal non-symmetric exponential distribution estimated above, the score for w becomes $$scr(w) = \sum_{i=1,L} (-1)^{w_i} F(y_i)$$

where $F(y_i)$ is given by:

$$F(y_i) = \begin{cases} \log\left(\frac{\alpha_{0R}}{\alpha_{1R}}\right) + \alpha_{1R}(y-\mu_1) - \alpha_{0R}(y-\mu_0) & y > \mu_1 \\ \log\left(\frac{\alpha_{0R}}{\alpha_{1L}}\right) + \alpha_{1L}(y-\mu_1) - \alpha_{0R}(y-\mu_0) & \mu_0 < y < \mu_1 \\ \log\left(\frac{\alpha_{0L}}{\alpha_{1L}}\right) + \alpha_{1L}(y-\mu_1) - \alpha_{0L}(y-\mu_0) & y < \mu_0 \end{cases} \quad (24)$$

The code word that achieves the highest score scr(w) is chosen for decoding the embedded message (step 106).

Finally, the selected ordered sequence of graphical templates is translated into symbols in accordance with the appropriate graphical template codebook. The is symbols are decoded into information 22 by the decoding stage 50 of decoding module 16.

In sum, the above-described embodiments provide a novel approach for generating and decoding graphical bar codes that are characterized by a high information capacity and a visual appearance that substantially corresponds to the original base image from which the graphical bar codes are generated.

The systems and methods described herein are not limited to any particular hardware or software configuration, but rather they may be implemented in any computing or processing environment, including in digital electronic circuitry or in computer hardware, firmware or software. The encoding and decoding modules may be implemented, in part, in a computer program product tangibly embodied in a machine-readable storage device for execution by a computer processor. In some embodiments, these modules preferably are implemented in a high level procedural or object oriented programming language; however, the algorithms may be implemented in assembly or machine language, if desired. In any case, the programming language may be a compiled or interpreted language. The encoding and decoding methods described herein may be performed by a computer processor executing instructions organized, e.g., into program modules to carry out these methods by operating on input data and generating output. Suitable processors include, e.g., both general and special purpose microprocessors. Generally, a processor receives instructions and data from a read-only memory and/or a random access memory. Storage devices suitable for tangibly embodying computer program instructions include all forms of non-volatile memory, including, e.g., semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

Other embodiments are within the scope of the claims.

What is claimed is:

1. A method of generating a graphical bar code, comprising:

applying an invertible graphical operation between regions of a base image and information-encoding graphical templates selected from a predefined template set to produce a graphical bar code with regions from which graphical templates are recoverable by applying an inverse graphical operation between graphical bar code regions and corresponding base image regions.

2. The method of claim 1, wherein the invertible graphical operation corresponds to an exclusive OR (XOR) operation.

3. The method of claim 2, further comprising applying XOR operations between the graphical bar code regions and corresponding base image regions to produce the graphical templates.

4. The method of claim 1, wherein each of the base image regions and the graphical templates has a same number of pixels.

5. The method of claim 4, wherein each of the base image regions and the graphical templates has a common pixel layout.

6. The method of claim 5, wherein the common pixel layout corresponds to a rectangular pixel array.

7. The method of claim 1, wherein each graphical template comprises a pattern of bright and dark pixels.

8. The method of claim 7, wherein the number of bright pixels is greater than the number of dark pixels.

9. The method of claim 7, wherein each pixel location within the predefined template set has an equal probability of being a dark pixel.

10. The method of claim 1, wherein the invertible graphical operation is applied between an ordered sequence of base image regions and a sequence of graphical templates ordered to substantially preserve local dark dot density uniformity across a concatenation of the ordered sequence of graphical templates.

11. The method of claim 1, wherein the invertible graphical operation is applied between respective sub-regions of the base image and respective graphical templates.

12. The method of claim 11, wherein the invertible graphical operation is applied between a predetermined sequence of base image sub-regions and an information-encoding sequence of graphical templates.

13. The method of claim 12, wherein the information-encoding sequence of graphical templates is recoverable by applying the inverse graphical operation between respective sub-regions of the graphical bar code and respective sub-regions of the base image ordered in accordance with the predetermined base image sub-region sequence.

14. A computer program residing on a computer-readable medium and comprising computer-readable instructions for causing a computer to:

apply an invertible graphical operation between regions of a base image and information-encoding graphical templates selected from a predefined template set to produce a graphical bar code with regions from which graphical templates are recoverable by applying an inverse graphical operation between graphical bar code regions and corresponding base image regions.

15. A method of decoding a graphical bar code, comprising:

applying an invertible graphical operation between regions of a graphical bar code and corresponding regions of a base image to produce a set of measurement blocks; and selecting from a predefined template set information-encoding graphical templates corresponding to the set of measurement blocks with the highest estimated probability.

16. The method of claim 15, wherein the invertible graphical operation corresponds to an XOR operation.

17. The method of claim 15, further comprising computing pixel value probabilities for each of the measurement blocks.

18. The method of claim 17, wherein pixel value probabilities are computed for a given measurement block based upon a weighted average of gray value measurements over the given measurement block.

19. The method of claim 18, wherein the weighted average of gray values is computed by fitting a mask to dot locations over the given measurement block.

20. The method of claim 19, wherein the mask has a truncated Gaussian profile.

21. The method of claim 18, further comprising estimating parameters of probability distributions fit to a histogram of the weighted average of gray value measurements.

22. The method of claim 21, wherein the probability distributions are asymmetric Laplacian distributions.

23. A computer program residing on a computer-readable medium and comprising computer-readable instructions for causing a computer to:

apply an invertible graphical operation between regions of a graphical bar code and corresponding regions of a base image to produce a set of measurement blocks; and select from a predefined template set information-encoding graphical templates corresponding to the set of measurement blocks with the highest estimated probability.

* * * * *